US012694820B2

(12) United States Patent
Jung et al.

(10) Patent No.: US 12,694,820 B2
(45) Date of Patent: Jul. 28, 2026

(54) DISPLAY DRIVING APPARATUS AND METHOD CAPABLE OF CONTROLLING PIXEL BRIGHTNESS

(71) Applicant: SAPIEN SEMICONDUCTORS INC., Gyeonggi-do (KR)

(72) Inventors: Dae Young Jung, Gyeonggi-do (KR); Hyun Tae Jung, Gyeonggi-do (KR); Do Kyung Kim, Gyeonggi-do (KR); Jong Gu Jeon, Gyeonggi-do (KR); Geun Taek Lee, Gyeonggi-do (KR); In Young Cho, Gyeonggi-do (KR)

(73) Assignee: SAPIEN SEMICONDUCTORS INC., Seongnam-si (KR)

( * ) Notice: Subject to any disclaimer, the term of this patent is extended or adjusted under 35 U.S.C. 154(b) by 362 days.

(21) Appl. No.: 18/687,187

(22) PCT Filed: Dec. 4, 2023

(86) PCT No.: PCT/KR2023/019774

§ 371 (c)(1),
(2) Date: Feb. 27, 2024

(87) PCT Pub. No.: WO2025/121452

PCT Pub. Date: Jun. 12, 2025

(65) Prior Publication Data

US 2026/0179529 A1 Jun. 25, 2026

(51) Int. Cl.
*G09G 3/32* (2016.01)

(52) U.S. Cl.
CPC ....... *G09G 3/32* (2013.01); *G09G 2310/0286* (2013.01); *G09G 2310/08* (2013.01); *G09G 2320/0626* (2013.01)

(58) Field of Classification Search
CPC ......... G09G 2310/08; G09G 2310/027; G09G 2310/0286; G09G 2310/0289;
(Continued)

(56) References Cited

U.S. PATENT DOCUMENTS

| | | | | |
|---|---|---|---|---|
| 5,977,944 A * | 11/1999 | Kubota | G09G 3/3688 | 345/98 |
| 6,300,930 B1 * | 10/2001 | Mori | G09G 3/3677 | 345/94 |

(Continued)

FOREIGN PATENT DOCUMENTS

| | | |
|---|---|---|
| KR | 20160001802 A | 1/2016 |
| KR | 10-2016-0012350 A | 2/2016 |

(Continued)

OTHER PUBLICATIONS

International Search Report dated Aug. 30, 2024, Application No. PCT/KR2023/019774; 3 pages.

(Continued)

*Primary Examiner* — Dong Hui Liang
(74) *Attorney, Agent, or Firm* — NKL Law; Jae Youn Kim

(57) ABSTRACT

A display driving apparatus according to an embodiment of the disclosure includes: a pixel driving circuit connected to each of a plurality of light-emitting diodes (LEDs) forming at least one row and column and configured to drive the LEDs in a pulse width modulation (PWM) method; a controller configured to determine a PWM duty ratio (PWM On-duty) indicating a light emitting time period of the LED during one frame section; and a timing controller configured to generate a first clock signal according to the PWM duty ratio and supply the first clock signal to the pixel driving circuit in a row or column unit through a shift register, wherein, when the PWM duty ratio is changed, the timing controller is configured to generate a second clock signal matching the changed PWM duty ratio, and selectively supply the first clock signal or the second clock signal to the pixel driving circuit.

10 Claims, 16 Drawing Sheets

(58) Field of Classification Search
CPC ..... G09G 2320/0233; G09G 2320/043; G09G 2320/0285; G09G 3/32; G09G 3/3233; G09G 3/2014; G09G 3/3208; G09G 3/36; G09G 3/20; G09G 3/3266; G09G 3/3225; G09G 3/3696; G09G 3/3677; G09G 3/3648; G09G 3/2092; G09G 2330/028; G09G 2330/021; G09G 2300/0861; G09G 2300/0819; G09G 2360/16
See application file for complete search history.

(56) References Cited

U.S. PATENT DOCUMENTS

2012/0200544 A1* 8/2012 Iwamoto .............. G09G 3/3685 377/67
2014/0340383 A1* 11/2014 Gyouten .............. G09G 3/3696 345/55
2016/0027387 A1* 1/2016 Park ..................... G09G 3/3611 345/88
2019/0013332 A1 1/2019 Lee
2020/0303468 A1* 9/2020 In ........................... H10K 59/40
2020/0394968 A1* 12/2020 Kwon .................. G09G 3/3291

FOREIGN PATENT DOCUMENTS

| | | | |
|---|---|---|---|
| KR | 10-2137638 | B1 | 7/2020 |
| KR | 10-2021-0092120 | A | 7/2021 |
| KR | 20210087867 | A | 7/2021 |
| KR | 20210092120 | A | 7/2021 |
| KR | 20220011368 | A | 1/2022 |
| KR | 10-2022-0083075 | A | 6/2022 |
| KR | 20240036248 | A | 3/2024 |

OTHER PUBLICATIONS

Korean Office Action dated Apr. 12, 2024, Application No. 10-2022-0112120; 7 pages.

* cited by examiner

DISPLAY DRIVING APPARATUS AND METHOD CAPABLE OF CONTROLLING PIXEL BRIGHTNESS

CROSS-REFERENCE TO RELATED APPLICATION

This is a National Stage application of PCT international application PCT/KR2023/019774 filed on Dec. 4, 2023, which is incorporated herein by reference in its entirety.

TECHNICAL FIELD

The present disclosure relates to a display driving apparatus and method capable of performing a detailed brightness control using a plurality of clock signals. Also, the present disclosure relates to a display driving apparatus and method capable of performing a detailed brightness control by using a dummy signal.

BACKGROUND ART

The present disclosure relates to a display driving apparatus and method, and in particular, to a display driving apparatus and method capable of flexibly controlling pulse width modulation (PWM) ON-duty switch that adjusts a light-emitting time of a pixel.

A display driving apparatus generally includes a plurality of pixels, e.g., M×N pixels. Each of the pixels may include one or more luminous elements and generally includes three luminous elements (R, G, and B). Each of the luminous elements is referred to as a sub-pixel.

From among various methods of controlling driving of sub-pixels, a PWM control method stores video data for controlling light-emission from a sub-frame during a single frame period in an internal memory and controls a gradation via PWM signals.

In the case of a pixel of a PWM driving method, image data is stored in a pixel memory for a certain time period (pixel programming). In addition, a sub-pixel emits light during a light-emitting time period (On duty) within one frame according to the image data stored in the pixel memory. Here, a brightness of the sub-pixel is controlled by the PWM method. A gray clock signal for PWM control is input to a driving circuit of a sub-pixel as shown in FIG. 1. Here, the number of gray clock signals (MSB, MSB-1, MSB-2, . . . , LSB) is determined according to the number of bits of the image data.

The brightness of the sub-pixel may be controlled by changing the light-emitting time period, and the change in the light-emitting time period may be controlled by adjusting the PWM ON-duty.

However, when the light-emitting time period is changed in order to adjust the brightness of the sub-pixel, the gray clock signal is changed and an output signal before the change is affected by the changed gray clock signal, thereby causing an error.

Also, due to the restricted number of driving signals, controlling the pixel brightness in the PWM method has an issue of having difficulty in fine adjustment of brightness. For example, because a period of the gray clock signal input to the driving circuit of the sub-pixel is consistent, when the period is constantly shifted to the period of the gray clock signal, it is difficult to minutely adjust the brightness based on a time interval less than the period of the gray clock signal.

The above-mentioned background art is technical information that the inventor has possessed for the derivation of the present disclosure or acquired in the process of derivation of the present disclosure, and cannot necessarily be said to be a known technique disclosed to the general public prior to the filing of the present disclosure.

DETAILED DESCRIPTION OF THE DISCLOSURE

Technical Problem

Provided are a display driving apparatus and method capable of performing a detailed brightness control using a plurality of clock signals. Provided is a display driving apparatus capable of performing a detailed brightness control using a dummy signal.

It will be appreciated by one of ordinary skill in the art that the objectives and effects that could be achieved with the present disclosure are not limited to what has been particularly described above and other objectives and advantages of the present disclosure will be more clearly understood from the following detailed description and embodiments of the present disclosure. Also, it will be readily understood that the objects and advantages of the present disclosure are realized by the means and combinations thereof set forth in the appended claims.

Technical Solution to Problem

To achieve the objective, according to an embodiment of the disclosure, there is provided a display driving apparatus including: a pixel driving circuit connected to each of a plurality of light-emitting diodes (LEDs) forming at least one row and column and configured to drive the LEDs in a pulse width modulation (PWM) method; a controller configured to determine a PWM duty ratio (PWM On-duty) indicating a light emitting time period of the LED during one frame section; and a timing controller configured to generate a first clock signal according to the PWM duty ratio and supply the first clock signal to the pixel driving circuit in a row or column unit through a shift register, wherein, when the PWM duty ratio is changed, the timing controller is configured to generate a second clock signal matching the changed PWM duty ratio, and selectively supply the first clock signal or the second clock signal to the pixel driving circuit.

According to another embodiment of the disclosure, there is provided a display driving apparatus including: a pixel driving circuit connected to each of a plurality of light-emitting diodes (LEDs) forming at least one row and column and configured to drive the LEDs in a pulse width modulation (PWM) method; a scan driving circuit configured to sequentially output a first signal to LEDs arranged in a first direction, from among the LEDs connected to the pixel driving circuit; a data driving circuit configured to output a second signal to LEDs arranged in a second direction, from among the LEDs connected to the pixel driving circuit; and the timing controller.

According to another embodiment of the disclosure, provided is a method of controlling a display driving apparatus, including: receiving a first clock signal corresponding to a first frame section and a second clock signal corresponding to a second frame section that is consecutive to the first frame section; receiving a first selection signal; a first frame driving step, in which the first selection signal is transferred to a selection signal shift register that corresponds to a first row of a plurality of light-emitting diodes (LEDs), a first clock signal is selected based on the first selection signal, and the first clock signal is transferred to a clock signal shift register connected to the first row; sequentially performing the first frame driving step up to an N-th row of the plurality of LEDs during the first frame section; receiving a second selection signal; a second frame driving step, in which the second selection signal is transferred to a selection signal shift register corresponding to the first row, the second clock signal is selected based on the second selection signal, and the second clock signal is transferred to the clock signal shift register connected to the first row; and sequentially performing the second frame driving step up to the N-th row during a second frame section, wherein at least one row in which the first frame driving step and the second frame driving step overlap each other is driven only by the first clock signal.

Besides, any other method and system for implementing the present disclosure, and a computer-readable recording medium on which a computer program for executing the method is stored may be further provided.

Other aspects, features and advantages other than those described above will become apparent from the following detailed description of the drawings, claims and disclosure.

Advantageous Effects of Disclosure

According to the technical solution of the present disclosure, a brightness of a display panel, which is subdivided as compared with the related art, may be controlled.

Also, according to the technical solution of the present disclosure, an optimal brightness control may be possible according to display quality or power consumption.

Also, according to the technical solution of the present disclosure, an output error from a shift register, which may occur when controlling a brightness of a display panel, may be addressed.

Also, according to the technical solution of the present disclosure, a brightness of a display panel may be adjusted more minutely.

The present disclosure is not limited to the aforementioned effects, and other effects of the present disclosure may be understood by the following description and will become apparent from the embodiments of the present disclosure.

BEST MODE

The display driving apparatus according to an embodiment of the disclosure includes: a pixel driving circuit connected to each of a plurality of light-emitting diodes (LEDs) forming at least one row and column and configured to drive the LEDs in a pulse width modulation (PWM) method; a controller configured to determine a PWM duty ratio (PWM On-duty) indicating a light emitting time period of the LED during one frame section; and a timing controller configured to generate a first clock signal according to the PWM duty ratio and supply the first clock signal to the pixel driving circuit in a row or column unit through a shift register, wherein, when the PWM duty ratio is changed, the timing controller is configured to generate a second clock signal matching the changed PWM duty ratio, and selectively supply the first clock signal or the second clock signal to the pixel driving circuit.

MODE OF DISCLOSURE

With respect to the terms used in embodiments of the disclosure, general terms currently and widely used are selected in view of function with respect to the disclosure. However, the terms may vary according to an intention of a technician practicing in the pertinent art, an advent of new technology, etc. In specific cases, terms may be chosen arbitrarily, and in this case, definitions thereof will be described in the description of the corresponding disclosure. Accordingly, the terms used in the description should not necessarily be construed as simple names of the terms, but be defined based on meanings of the terms and overall contents of the present disclosure.

It will be further understood that the terms "comprises" and/or "comprising," when used in this specification, specify the presence of stated components, but do not preclude the presence or addition of one or more components. In addition, the terms such as "... unit", "module", etc. provided herein indicate a unit performing at least one function or operation, and may be realized by hardware, software, or a combination of hardware and software. In addition, the terms such as "... unit", etc. provided herein may be realized by a hardware component such as a processor or a circuit, and/or a software component executed by a hardware component such as a processor.

In description of the disclosure, the terms “first” and “second” may be used to describe various components, but the components are not limited by the terms. The terms may be used to distinguish one component from another component.

When an element is “connected to” another device, this may include the cases in which the element is directly connected to another element and another element may intervene therebetween.

Embodiments will be described in detail below with reference to accompanying drawings. However, the embodiments may be implemented in various manners, and are not limited to one or more embodiments described herein.

Figure 1:
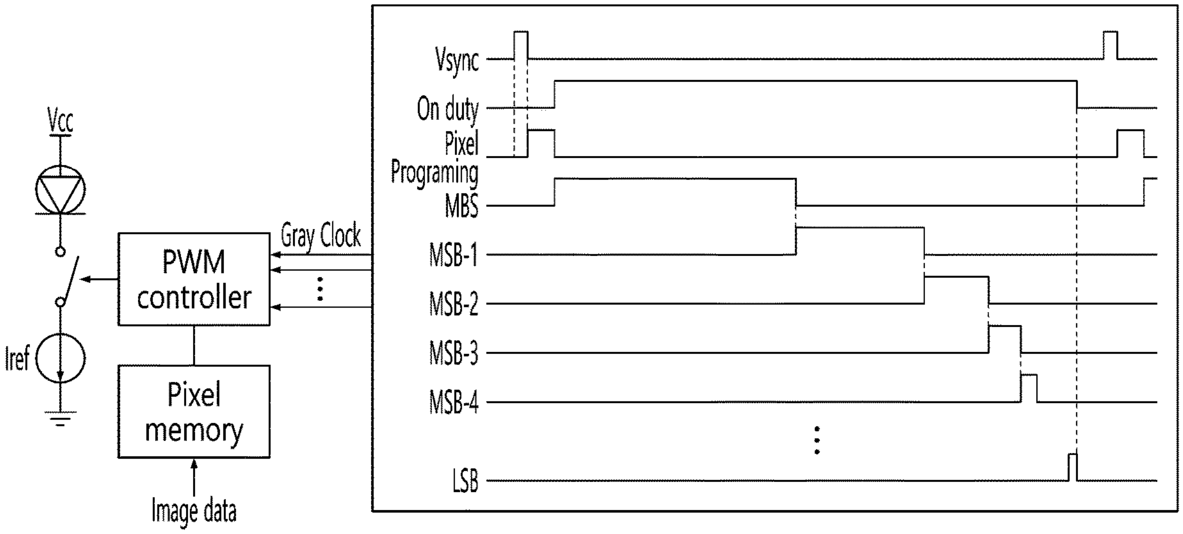
FIG. 1 is a driving circuit diagram of a sub-pixel according to the related art.
Figure 2:
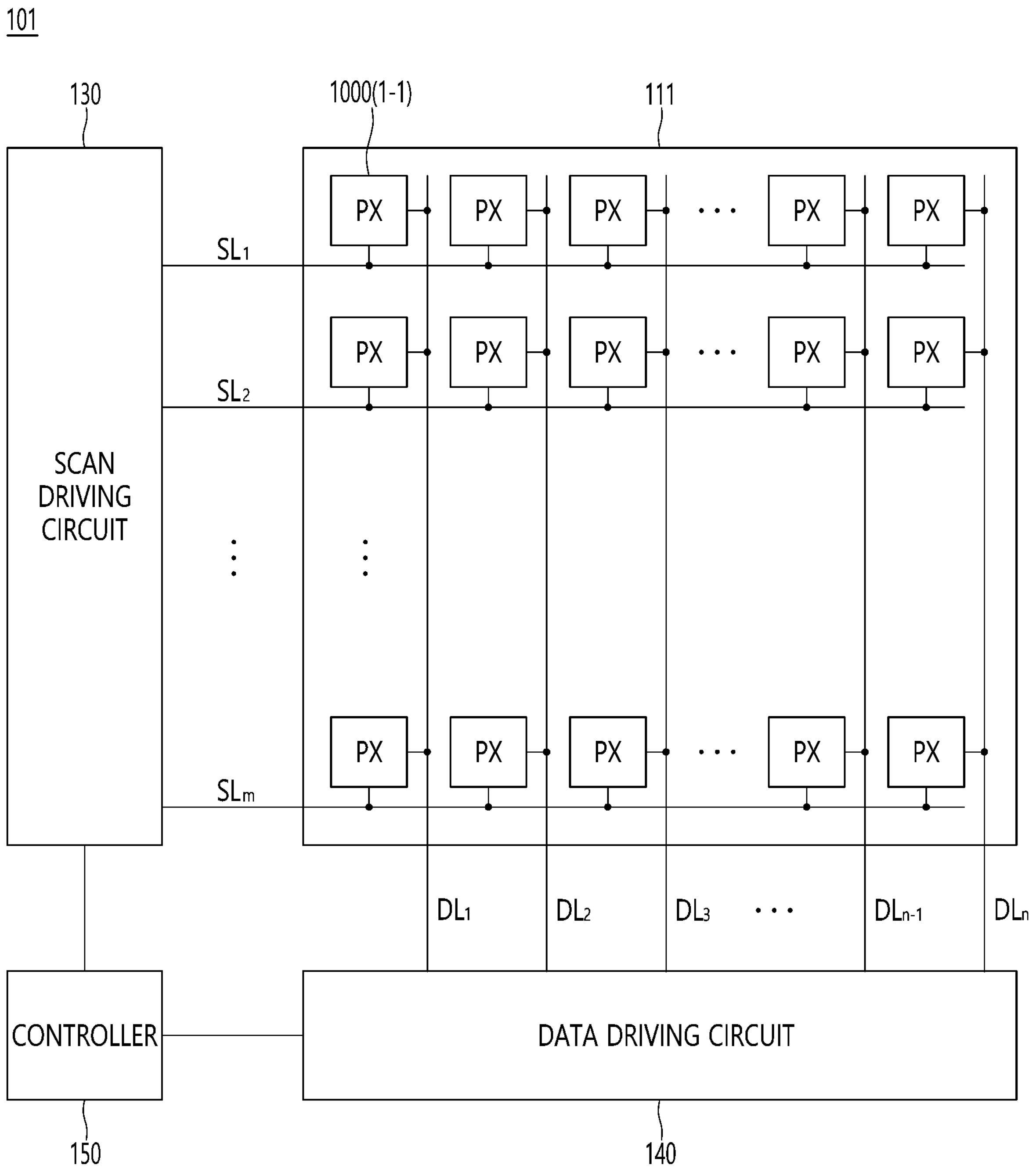
FIG. 2 is a block diagram schematically showing a display driving apparatus according to an embodiment.

FIG. 2 is a block diagram schematically showing a display driving apparatus according to an embodiment.

Referring to FIG. 2, a display driving apparatus 101 according to an embodiment may include a display panel 111, a scan driving circuit 130, a data driving circuit 140, and a controller 150. In addition, the controller 150 may include a timing controller (not shown), but is not limited thereto. For example, the display driving apparatus 101 may include the display panel 111, the scan driving circuit 130, the data driving circuit 140, the controller 150, and a timing controller (not shown).

The display panel 111 may include a plurality of pixels PX. A plurality of pixels PX may be arranged in a matrix of m×n (m and n are natural numbers). However, the plurality of pixels may be arranged in various patterns according to the embodiment, e.g., a zigzag pattern.

The display panel 111 may be implemented as one of a liquid crystal display (LCD), light-emitting diode (LED) display, organic LED (OLED) display, active-matrix OLED (AMOLED) display, electrochromic display (ECD), digital mirror device (DMD), actuated mirror device (AMD), Grating Light Valve (GLV), Plasma Display Panel (PDP), Electro Luminescent Display (ELD), and vacuum fluorescent display (VFD), and may be implemented as any other type of flat panel display or flexible display. In the specification, an LED display panel will be described as an example.

Each pixel PX may include one or more luminous elements. The luminous element may be an LED. The LED may be a micro LED having a size of 80 μm or less. One pixel PX may output various colors through a plurality of luminous elements having different colors. In an example, one pixel PX may include luminous elements of red, green, and blue colors. In another example, when a white luminous element may be further included, the white luminous element may replace any one of the red, green, and blue luminous elements. In an embodiment in which one pixel PX includes a plurality of luminous elements, each luminous element included in one pixel PX may be referred to as a sub-pixel.

Each sub-pixel may store data related to a brightness of color to be output for one image frame, that is, gradation. A magnitude of data regarding the gradation may vary, and in the embodiment, data of 10 bits is described as an example in the specification. However, the display driving apparatus 101 according to the specification is not limited to the above example.

Each pixel PX may include a pixel driving circuit for driving the luminous element, that is, sub-pixel, included in the pixel. The pixel driving circuit may drive a turn-on or turn-off operation of the sub-pixel according to a signal output from the scan driving circuit 130 and/or the data driving circuit 140. In an example, the pixel driving circuit may include at least one transistor, at least one capacitor, etc. The pixel driving circuit is implemented on a semiconductor wafer to form a stack structure along with the luminous element to be connected to the luminous element, or may be arranged on a side surface of the luminous element to be connected to the luminous element, and thus, the pixel driving circuit may control the light emission of the luminous element.

In addition, the display panel 111 may include one or more scan lines $SL_1$ to $SL_m$ arranged in a first direction and one or more data lines $DL_1$ to $DL_n$ arranged in a second direction. Here, the first direction refers to a row direction or column direction, and the second direction refers to the column direction or row direction. In an example, the first direction may be the row direction and the second direction may be the column direction. In another example, the first direction may be the column direction and the second direction may be the row direction.

In addition, the pixel PX may be located at each of cross points between one or more scan lines $SL_1$ to $SL_m$ and one or more data lines $DL_1$ to $DL_n$. Each pixel PX may be connected to one scan line $SL_k$ and one data line $DL_k$. One or more scan lines $SL_1$ to $SL_m$ may be connected to the scan driving circuit 130 and one or more data lines $DL_1$ to $DL_n$ may be connected to the data driving circuit 140.

The scan driving circuit 130 may output a signal configured to drive one or more pixels connected to one of the one or more scan lines $SL_1$ to $SL_m$(hereinafter, a first signal). For example, the scan driving circuit 130 may sequentially select one or more scan lines $SL_1$ to $SL_m$. In an example, a pixel connected to a first scan line $SL_1$ may be driven during a first scan driving period and a pixel connected to a second scan line $SL_2$ may be driven during a second scan driving period.

The data driving circuit 140 may output a signal related to gradation (hereinafter, a second signal) to each pixel via one or more data lines $DL_1$ to $DL_n$. In an example, as shown in FIG. 2, one data line is connected to one or more pixels in a longitudinal direction, but the signal related to the gradation may be input only to pixels connected to the scan line selected by the scan driving circuit 130.

The controller 150 may output a control signal for executing operations of the scan driving circuit 130 and the data driving circuit 140. The controller 150 may output a control signal corresponding to image data corresponding to one image frame to the scan driving circuit 130 or the data driving circuit 140. The controller 150 may determine a PWM duty ratio (PWM On-duty), which represents the emission time period of the LED during one frame period.

In addition, the scan driving circuit 130 and the data driving circuit 140 may each include a processor, an application-specific integrated circuit (ASIC), another chipset, a logic circuit, a register, a communication modem, a data processing apparatus, etc. known in the technical field to which the disclosure belongs, in order to execute various control logics described above. Also, when the control logic is implemented as software, the scan driving circuit 130 and the data driving circuit 140 may be each implemented as a set of program modules. Here, the program modules are stored in the memory device and may be executed by a processor. In an example, the scan drive circuit 130 may include at least one shift register. Here, the shift register may correspond to any one of a plurality of shift registers 120_1, 120_2, . . . , **120_*k* of FIG. 3. Also, the shift register may correspond to a timing controller 120 of FIG. 9 or a timing controller 1120 of FIG. 14** that is described later.

For a computer to read a program and to execute a method implemented by the program, the program may include a code that is coded in a computer language, which a processor (e.g., a central processing unit (CPU)) of the computer may read through a device interface of the computer, such as C, C++, C#, JAVA, Python, or a machine language. This code may include a functional code related to a function or the like that defines functions required to execute the methods, and may include an execution procedure-related control code necessary for the processor of the computer to execute the functions in accordance with a predetermined procedure. Also, such a code may further include a memory reference related code as to which additional information or media required for the processor of the computer to execute the above-described functions should be referenced at any location (address) of the internal or external memory of the computer. In addition, when the processor of the computer needs to communicate with any other computer, server, etc., which are at remote locations, to perform the above-described functions, the code may further include a communication-related code as to how to communicate with which remote computer, server, etc., what information or media should be transmitted or received during communication, and the like.

The storage medium storing the program may denote the medium that does not store data for a short period of time such as a register, a cache memory, or the like but semi-permanently stores to be read by the device. Specifically, the storage medium may include, but is not limited to, a read-only memory (ROM), a random-access memory (RAM), a CD-ROM, a magnetic tape, a floppy disk, an optical data storage device, and the like. That is, the program may be stored in various recording media on various servers to which the computer may access, or in various recording media on the user's computer. The storage medium may also be distributed over network coupled computer systems so that the computer readable code is stored in a distributive manner.

Figure 3:
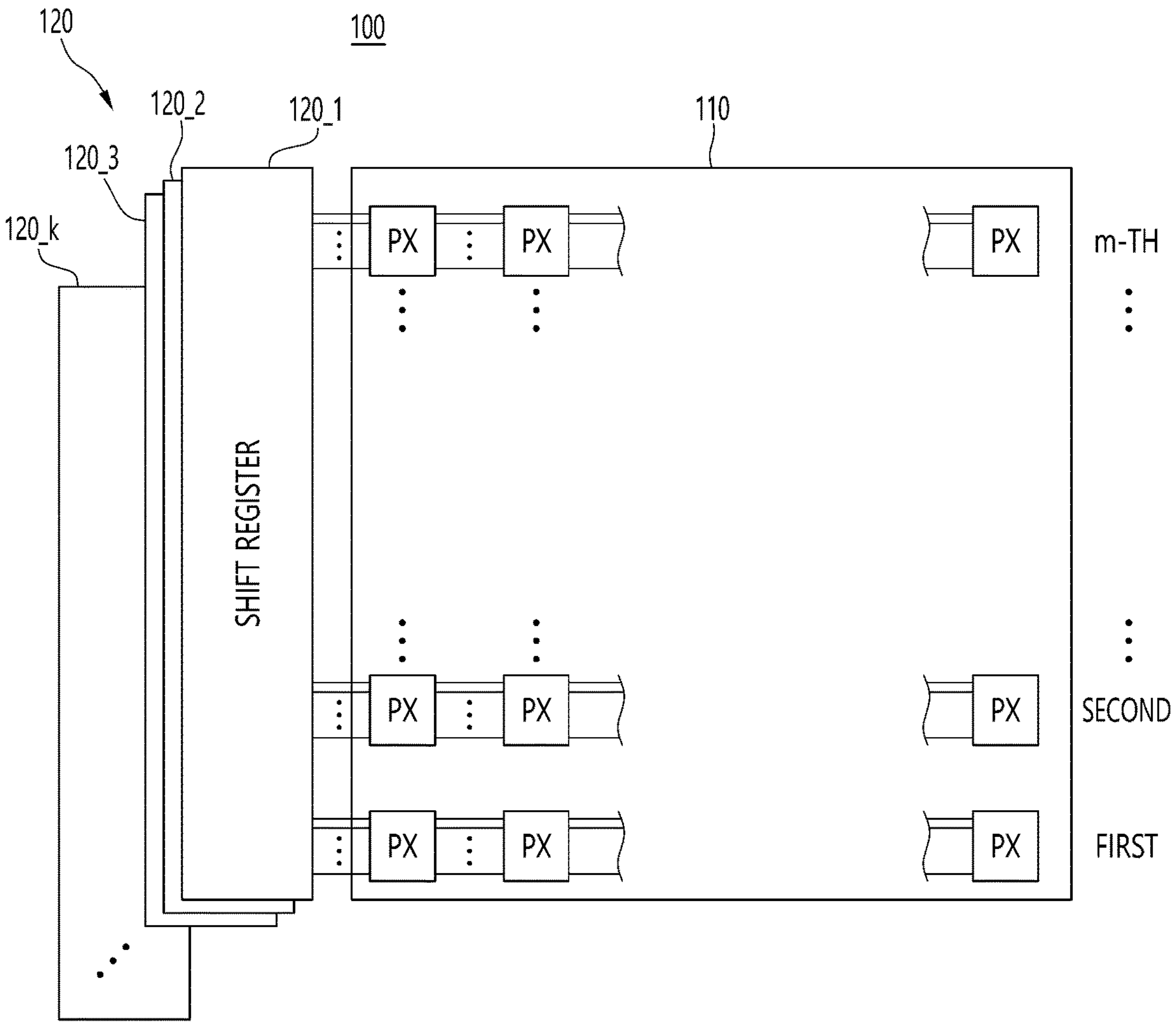
FIG. 3 is a block diagram schematically showing a display driving apparatus including a timing controller according to an embodiment.

FIG. 3 is a block diagram schematically showing a display driving apparatus including a timing controller according to an embodiment.

Referring to FIG. 3, a display driving apparatus 100 may include a display panel 110 and the plurality of shift registers 120_1, 120_2, . . . , 120_*k*.

For convenience of description, the plurality of shift registers 120_1, 1202, . . . , 120_*k* are shown in FIG. 3, but the embodiment is not limited thereto. In other words, there may be one shift register. Preferably, there may be one shift register or as many as the number of lines in the display panel, and the shift register may supply the PWM clock signal that controls a PWM driving section to each line. Hereinafter, a unit for generating or supplying the PWM clock signal, including the shift register or the plurality of shift registers 120_1, 120_2, . . . , 120_*k* is defined as the timing controller 120. In addition, the timing controller 120 may include at least one of the scan drive circuit 130 or the data driving circuit 140 of FIG. 2.

In addition, as described above, the scan driving circuit 130 of FIG. 2 may include at least one shift register. That is, the scan driving circuit 130 of FIG. 2 corresponds to the plurality of shift registers 120_1, 120_2, . . . , 120_*k* of FIG. 3. Although the data driving circuit 140 and the controller 150 of FIG. 2 are not shown in FIG. 3, those who skilled in the art would easily understand that the data driving circuit and the controller may be configured in FIG. 3, as shown in FIG. 2. Therefore, the display driving apparatus 100 and the display panel 110 correspond to the display driving apparatus 101 and the display panel 111 of FIG. 2. Hereinafter, descriptions about the display driving apparatus 100 and the display panel 110, overlapping the descriptions provided with reference to FIG. 2, are omitted.

In an example, the timing controller 120 generates a first clock signal according to the PWM duty ratio and may supply the first clock signal to the pixel driving circuit in a row or column unit via the shift register. In addition, when the PWM duty ratio is changed, the timing controller 120 generates a second clock signal according to the changed PWM duty ratio, and may selectively supply the first clock signal or the second clock signal to the pixel driving circuit.

In another example, the timing controller 120 may generate the first clock signal according to the PWM duty ratio, may generate a PWM clock signal based on the first clock signal through the shift register, and may supply the PWM clock signal to the pixel driving circuit in the row or column unit. In addition, when the PWM duty ratio is changed, the timing controller 120 may generate the second clock signal according to the changed PWM duty ratio, select the first clock signal or the second clock signal, generate the PWM clock signal based on the selected clock signal, and supply the PWM clock signal to the pixel driving circuit.

In another example, the timing controller 120 may generate the first clock signal according to the PWM duty ratio, generate a dummy clock signal based on the first clock signal, and control the brightness of the LED by using the first clock signal and the dummy clock signal.

In another example, the timing controller 120 may generate the dummy clock signal by delaying the first clock signal by a certain time interval. Here, the certain time interval may denote a time during which the dummy clock signal is delayed with respect to the first clock signal. When the dummy clock signal is generated by delaying the first clock signal by 1H-ΔT, the certain time interval may be 1H-ΔT.

In another example, the timing controller 120 may generate the PWM clock signal based on the clock signal, and may supply the PWM clock signal to the pixel driving circuit in the row or column unit.

In another example, the timing controller 120 may generate a dummy signal based on the dummy clock signal, and may not supply the dummy signal to the pixel driving circuit.

The timing controller 120 may output pulse signals to a plurality of pixel lines based on a certain period, by using the pulse signal having a width and the dummy signal in order to adjust the brightness of the display panel.

The pixel line refers to an electrical connection through which the PWM clock signal output from the timing controller 120 is input to the pixel. The pixel lines may be connected in parallel to all pixels connected to the same row or column. In an example, when 'm' is 533, the timing controller 120 may include 533 pixel lines.

Figure 4:
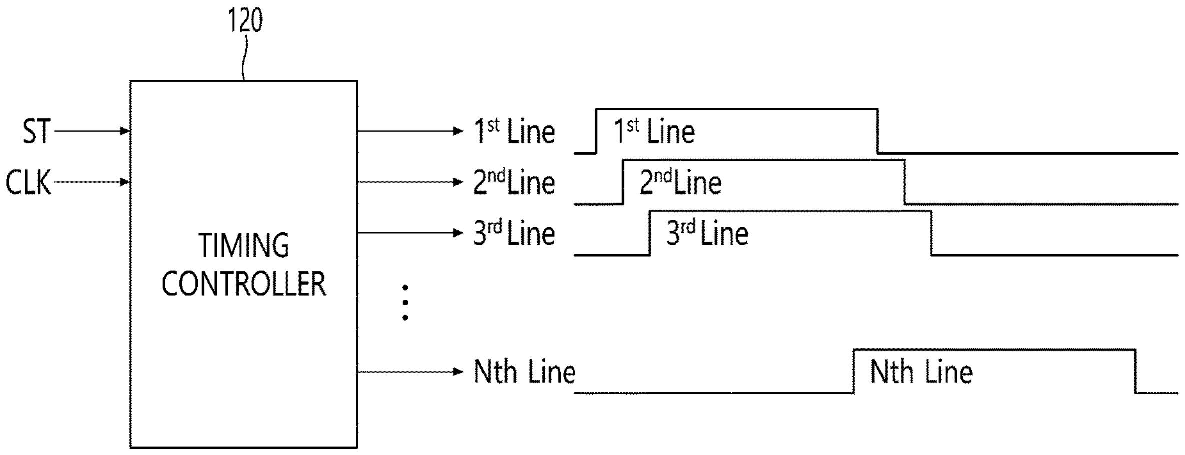
FIG. 4 is a block diagram schematically showing an example of a pulse width modulation (PWM) clock signal output by a timing controller.

FIG. 4 is a block diagram schematically showing an example of a PWM clock signal output by a timing controller.

Referring to FIG. 4, a timing diagram in which the PWM clock signals are sequentially output to the pixel lines by the timing controller using a single clock is shown. Here, the timing controller may include the shift register. In detail, an ST signal is a pulse signal for a PWM On-duty section in which the LED emits light in relation to the PWM control. A CLK signal is a signal input to a plurality of flipflops or a MUX(Multiplexer) in the timing controller. A PWM clock signal is a signal output to the pixel line, and is the ST signal output in synchronization with the period of the CLK signal.

In the block diagram of the timing controller 120 of FIG. 4, the ST signal is input to the timing controller 120. Here, the ST signal is shifted by the CLK signal and is sequentially output to each of the pixel lines.

In the timing diagram at the right side of FIG. 4, the ST signal is input and shifted sequentially from a first line to an N-th line due to the CLK signal, and thus, is output to each pixel line as the PWM clock signal. The PWM clock signal is output to the pixel line in an order in which the ST signal is shifted by the CLK signal. Therefore, there is a time different determined by the CLK signal for each PWM clock signal of each line.

Figure 5:
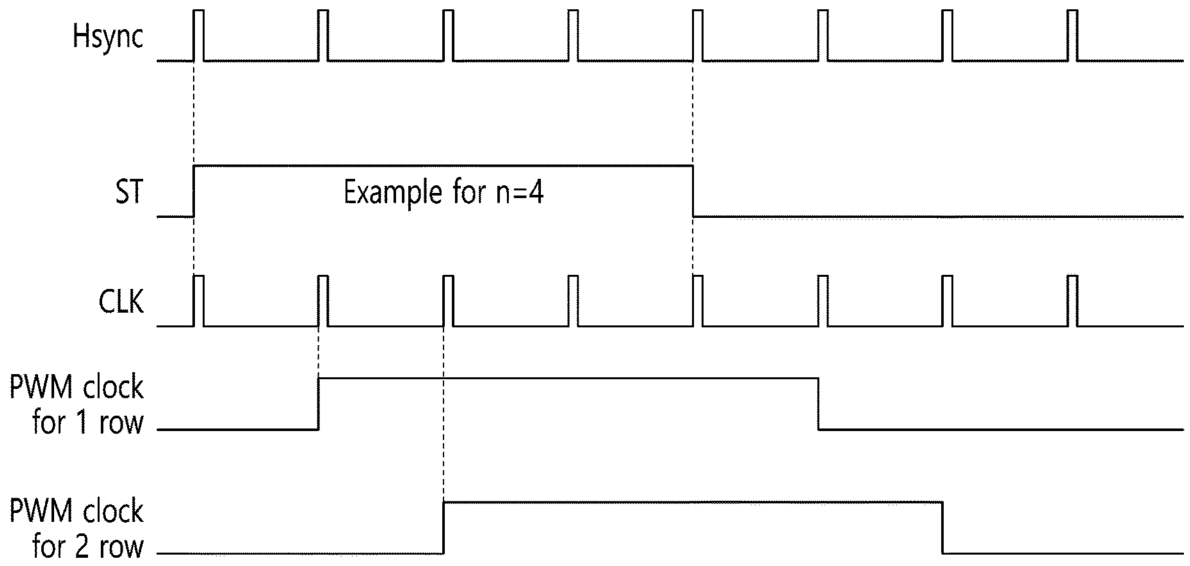
FIG. 5 is a timing diagram showing another example of a PWM clock signal output by a timing controller when a single clock is used.

FIG. 5 is a timing diagram showing another example of a PWM clock signal output by a timing controller when a single clock is used.

An Hsync signal denotes a timing at which the signal moves in each row in the display. Referring to FIG. 5, when a panel may include, for example, for row lines, and the LED is driven with 100% of PWM On-duty that represents the maximum brightness of the LED, the ST signal having a length four times greater than a pulse period (1H) included in the Hsync signal may be generated.

In an example, the CLK signal is input to the MUX, and the ST signal input to the timing controller may be shifted in response to the CLK signal and output to the pixel line.

In another example, the CLK signal is input to the plurality of flipflops in the shift register, and has pulses with the same period as a pulse period in the Hsync signal. Therefore, the ST signal input to a first flipflop is synchronized with the pulse period of the Hsync signal due to the CLK signal, and then, may be output from the next flipflop.

In another example, the CLK signal is input to the plurality of flipflops in the timing controller, and has pulses with the same period as a pulse period in the Hsync signal. Therefore, the ST signal input to a first flipflop is synchronized with the pulse period of the Hsync signal due to the CLK signal, and then, may be output from the next flipflop.

Figure 6:
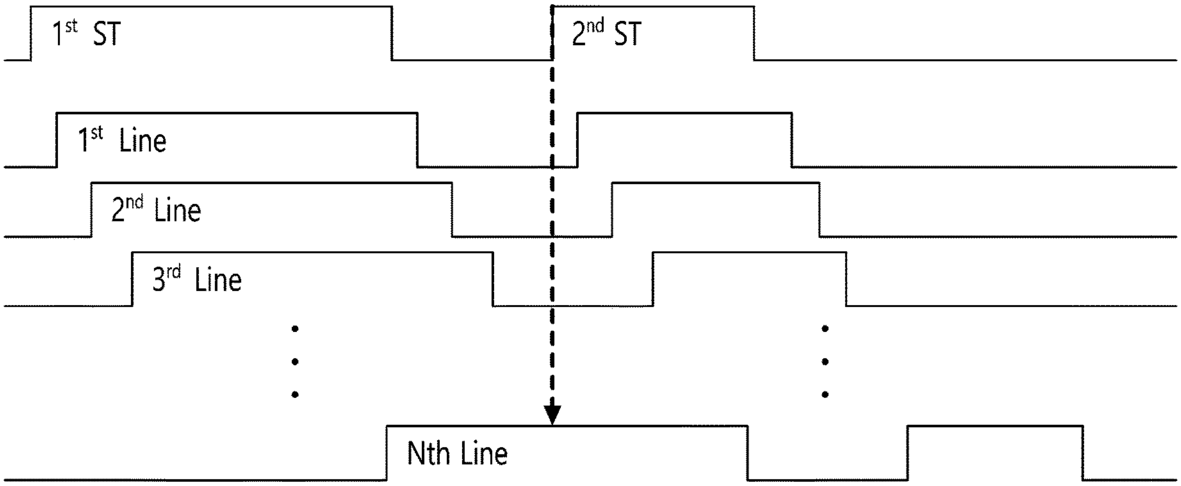
FIG. 6 is a timing diagram schematically showing a problem of a pulse signal output by a timing controller when a single clock is used.

FIG. 6 is a timing diagram schematically showing a problem of a pulse signal output by a timing controller when a single clock is used.

Referring to FIG. 6, when it is assumed that a first ST signal is switched into a second ST signal in order to drive the LED by adjusting the PWM On-duty in the PWM driving time period of the first ST signal, for example, adjusting the brightness to 75% of PWM On-duty, an issue that occurs when the ST signal having a changed width is input into the timing controller using a single clock may be identified. In detail, the width of the ST signal may be changed for the driving change, e.g., the brightness of the display. Here, when the width of the ST signal is changed, the period of the CLK signal is also changed. The changed period of the CLK signal may affect the entire circuit via the shift register. Therefore, the pulse signal output to an N-th pixel line due to the ST signal before the width thereof is changed at the point in time when the period of the CLK signal is changed is affected by the changed CLK signal, thereby generating an error in the output.

In summary, the timing controller using the single clock signal uses only one CLK signal, and thus, the CLK signal that is changed according to the ST signal having the changed width affects the pulse signal according to the previous ST signal. Accordingly, an error such as flickering of the signal or turning-off of the signal may occur.

Figure 7:
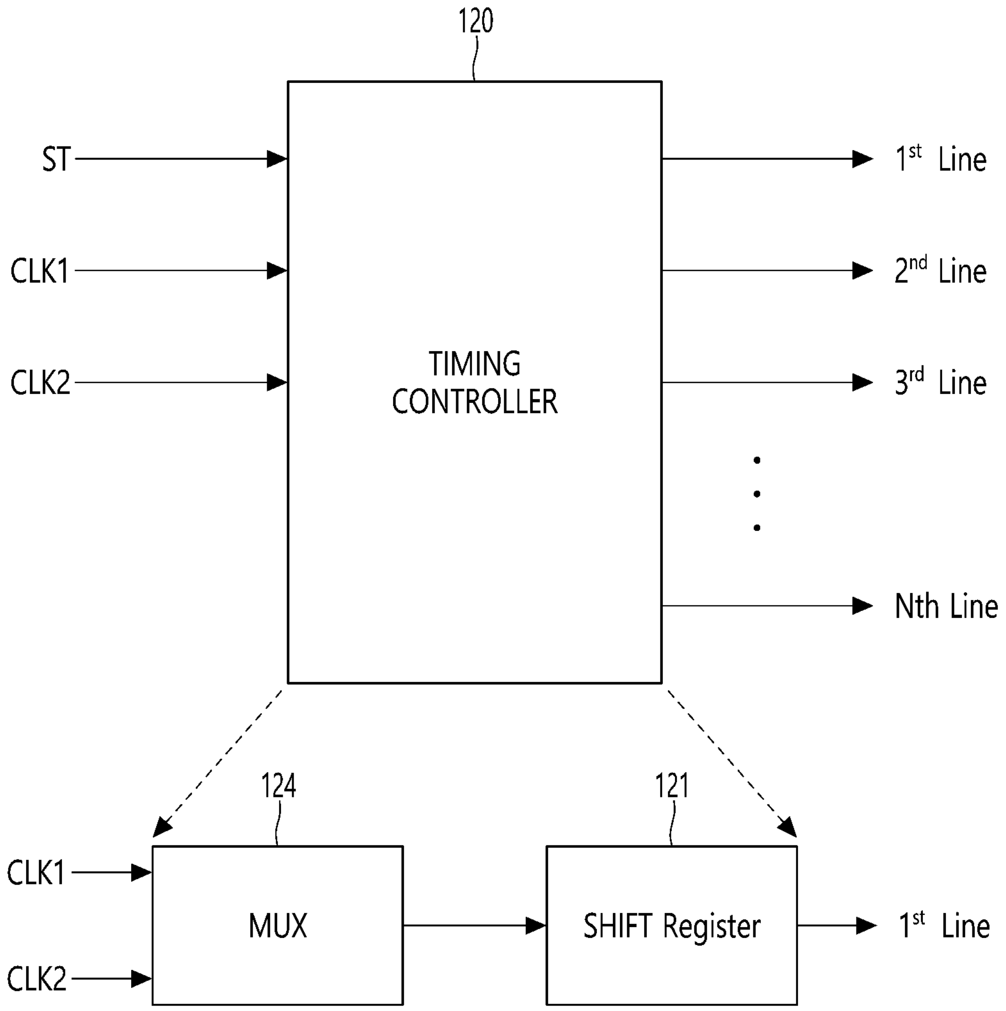
FIG. 7 is a block diagram schematically showing a timing controller according to an embodiment.

FIG. 7 is a block diagram schematically showing a timing controller according to an embodiment.

Referring to FIG. 7, it may be identified that the timing controller 120 includes a MUX 124. In FIG. 7, the MUX 124 is included in the timing controller 120, but the MUX 124 may not be included in the timing controller 120 but may be individually configured, and is not limited thereto.

In addition, the MUX 124 is shown as a component for selecting the clock signal, but the component may be implemented by other components in the display driving apparatus and is not limited thereto. Therefore, operations of the MUX 124, which are described below, may be respectively implemented by the timing controller 120, the scan drive circuit 130, the data drive circuit 140, the controller 150, or more devices.

First, the MUX 124 included in the configuration of the timing controller 120 may select one clock signal from among the clock signals of a CLK 1 signal and a CLK 2 signal. In detail, when the ST signal having a certain width is initially input to the timing controller 120, respective PWM clock signals are sequentially output to pixel lines according to the CLK 1 signal corresponding to the ST signal. In addition, when a ST signal having different width from that of the first ST signal is input to the timing controller, respective PWM clock signals are sequentially output to the pixel lines according to the CLK 2 signal corresponding to the ST signal.

Even when the ST signal having different width is input to a shift register 121, the clock signals different from those of the first ST signal are used, and thus, the CLK signal changed according to the ST signal having changed width does not affect the pulse signals according to the previous ST signal. Therefore, the issue of the timing controller in FIG. 6, that is, the pulse signal according to the previous ST signal is affected by the CLK signal that is changed according to the ST signal having changed width because of using only one CLK signal, may be addressed.

In addition, the MUX 124 receives inputs of the plurality of clock signals from at least one clock input terminal, and selects one clock signal from among the plurality of clock signals. The CLK signal matching the PWM On-duty ratio applied for each line may be selected by using the MUX 124, and accordingly, even when the light-emitting time duration is changed in order to adjust the brightness of the sub-pixel, the output signal before the change is not affected by the changed clock signal when the clock signal is changed, and an error may not occur.

In an example, the MUX 124 receives inputs of two clock signals respectively from two clock input terminals, and may select one clock signal. In detail, after receiving the CLK 1 signal and the CLK 2 signal from the clock input terminals, the MUX 124 selects one of the clock signals.

In addition, the MUX 124 receives the inputs of the plurality of clock signals from at least one clock input terminal and may select one clock signal from among the plurality of clock signals by using a switch.

In addition, the timing controller 120 may include at least one flipflop including an output terminal connected to the pixel driving circuit, and at least one MUX 124 selecting the clock signal input to a clock terminal of the at least one flipflop. In an example, the MUX 124 receives the plurality of clock signals from at least one clock input terminal and may select one clock signal input to the clock terminal of the at least one flipflop from among the plurality of clock signals. In another example, the MUX 124 may select one clock signal input to the clock terminal of the at least one flipflop by using a switch.

Figure 8:
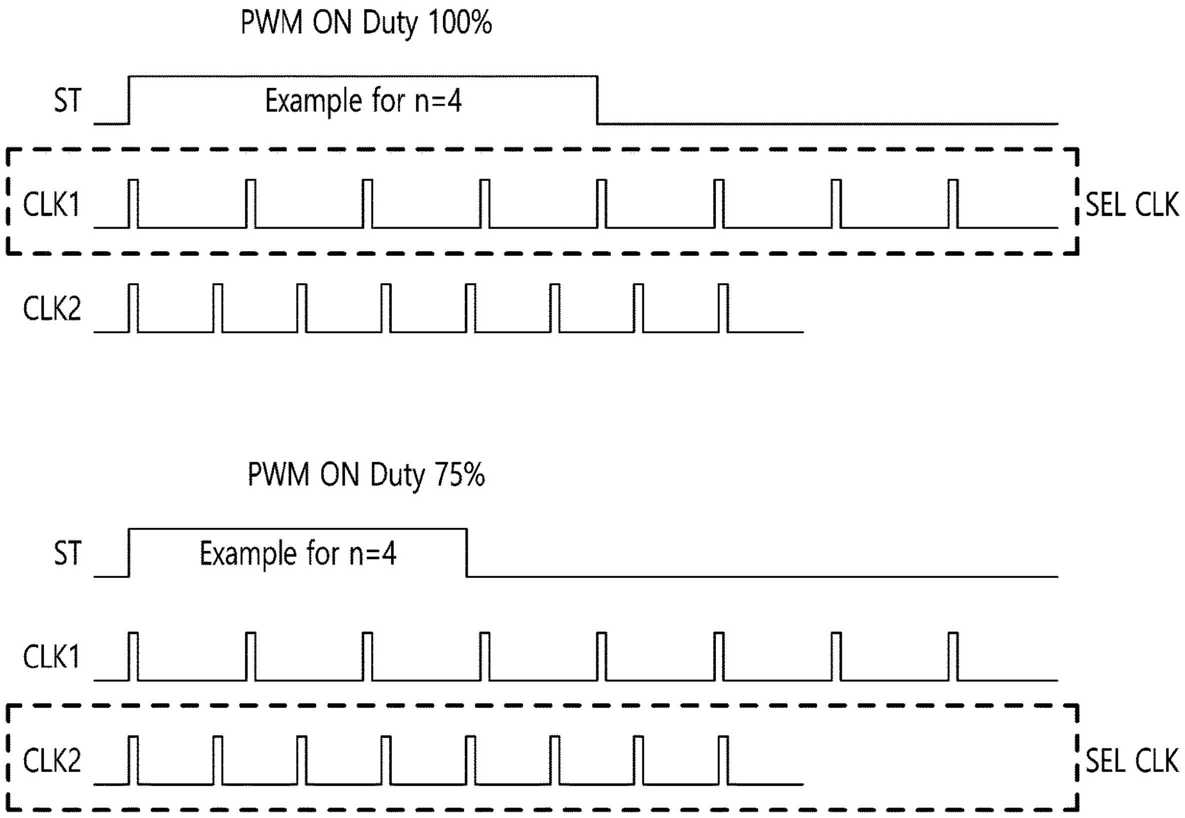
FIG. 8 is a timing diagram showing an example in which a CLK signal is selected by a timing controller according to an embodiment.

FIG. 8 is a timing diagram showing an example in which the CLK signal is selected by the timing controller according to an embodiment.

Referring to FIG. 8, for example, when the width of the ST signal is determined so that the LED is driven with PWM On-duty of 100%, the period of the corresponding clock signal, that is, the CLK 1 signal, is determined to match the width of the ST signal, and the CLK 1 signal is shifted by 1 H and input for each row line via the timing controller. After that, the width of the ST signal is changed so that the LED is driven by adjusting the PWM On-duty to 75%, the clock period of the corresponding CLK signal is also adjusted, and thus, the clock signal changed to the CLK 2 signal is input through the timing controller. Here, in order to prevent an error from occurring in the output because the pulse signal output to an N-th pixel line according to the ST signal for driving with the PWM On-duty of 100% is affected by the CLK 2 signal that is changed, the previous CLK 1 signal is also input through the MUX even when the CLK 2 signal is input, so that the shift register may selectively use the CLK 1 signal or the CLK 2 signal suitable for the corresponding line.

Figure 9:
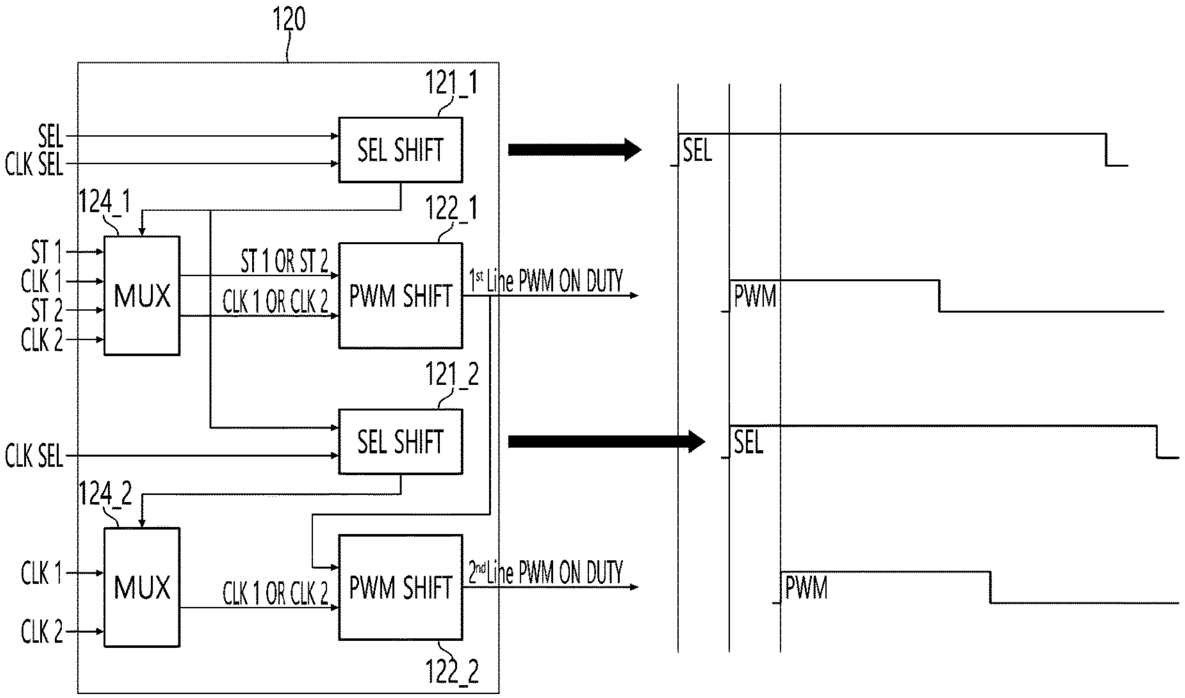
FIG. 9 is a block diagram schematically showing a timing controller including a MUX according to an embodiment.

FIG. 9 is a block diagram schematically showing a timing controller including an MUX according to an embodiment.

The timing controller 120 includes the multiplexer (MUX), a selection signal shift register (SEL SHIFT), and a PWM signal shift register (PWM SHIFT). The PWM signal shift register may be a clock signal shift register. Also, although not shown in FIG. 9, the timing controller 120 may include a clock signal selector (not shown). The clock signal selector (not shown) outputs a selection signal (SEL signal) for selecting one of the plurality of clock signals based on driving information of the pixel driving circuit.

For convenience of description, FIG. 9 shows two MUXs 124_1 and 1242, but one MUX may be used, and one or more embodiments are not limited thereto.

The SEL signal is a signal for selecting one of the plurality of CLK signals, and the timing controller 120 may receive or generate the SEL signal and transfer the SEL signal to the MUX via the SEL SHIFT. In addition, the MUXs 124_1 and 1242 may each select one CLK signal based on the SEL signal transferred from the SEL SHIFT and transfer the selected signal to the shift register. In an example, the SEL SHIFT may output a selection signal (SEL signal) in each pixel line unit, for selecting a first clock signal (CLK 1 signal) or a second clock signal (CLK 2 signal), based on the driving information of the pixel driving circuit. In addition, the MUX may output the first clock signal or the second clock signal based on the selection signal (SEL signal). The first clock signal and the second clock signal operate independently of each other with respect to the pixel driving circuit.

Referring to FIG. 9, SEL SHIFTs 121_1 and 121_2 refer to shift registers that shift the SEL signal in response to the clock cycle. The clock signal selector (not shown) transfers the selection signal (SEL signal) for selecting the first clock signal or the second clock signal to the SEL SHIFT 121_1, based on the driving information of the pixel driving circuit. The SEL signal is a signal for selecting one of the CLK 1 signal and the CLK 2 signal. In an example, a signal consisting of 0 or 1 may be transferred to the MUX, so that the MUX transfers the CLK 1 signal when the SEL signal consists of 1 and transfers the CLK 2 signal when the SEL signal consists of 0. The SEL SHIFT 121_1 receives the SEL signal and a CLK SEL signal. The SEL signal is input to the SEL SHIFT and is shifted, and then, sequentially output in each pixel line unit. The PWM SHIFTs 122_1 and 122_2 refer to shift registers that shift the ST signal in response to the clock cycle and output the ST signal in each pixel line unit. The CLK SEL signal denotes a clock signal for the SEL signal, and as the ST signal is shifted in the PWM SHIFTs 122_1 and 122_2 by the CLK signal, the SEL signal is also shifted in the SEL SHIFTs 121_1 and 121_2 by the SEL CLK signal. Thus, the same CLK signal may be selected for the same ST signal. The MUX 124_1 receives the SEL signal from the SEL SHIFT 121_1. The MUX 124_1 receives a ST 1 signal and a ST 2 signal, and receives the CLK 1 signal and the CLK 2 signal with respect to the ST signals (ST 1 signal and ST 2 signal). Here, the MUX 124_1 selects the CLK 1 signal and the ST 1 signal and transfers to the PWM SHIFT 122_1 based on the received SEL signal. Here, the MUX 124_1 may use a switch when selecting the clock signal. In an example, the MUX 124_1 may transfer the CLK 1 signal by receiving the SEL signal consisting of 1 and turning on the switch. The PWM SHIFT 122_1 shifts and transfers the ST 1 signal to a first line. Likewise, the MUX 124_2 receives the SEL signal and the CLK SEL signal from the SEL SHIFT 121_2. Here, the SEL signal received by the MUX 124_1 is a signal that has been shifted once by the SEL SHIFT 121_1. The MUX 124_2 receives the CLK 1 signal and the CLK 2 signal. In addition, the MUX 124_2 selects and transfers the CLK 1 signal or the CLK 2 signal to the PWM SHIFT 122_2 according to the received SEL signal. Here, the MUX 124_2 selects and transfers the CLK 1 signal to the PWM SHIFT 122_2 according to the SEL signal. The PWM SHIFT 122_2 shifts and transfers the ST 1 signal to a second line, based on the ST 1 signal received from the PWM SHFT 122_1 and the CLK 1 signal received from the MUX 124_2.

While the ST 1 signal and the CLK 1 signal are transferred for each line via the shift register, the SEL SHIFT 121_1 may transfer the SEL signal to the MUX 124_1 as a selection signal for selecting the CLK 2 signal. The MUX 124_1 selects the CLK 2 signal as the clock signal and the ST 2 signal as the ST signal according to the received SEL signal, and then transfers the signals to the PWM SHIFT 122_1. The PWM SHIFT 122_1 shifts and transfers the ST 2 signal to the first line. Likewise, the MUX 124_2 receives the SEL signal and the CLK SEL signal from the SEL SHIFT 121_2. Here, the SEL signal may be a signal that has been shifted once by the SEL SHIFT 121_1. The MUX 124_2 receives the CLK 1 signal and the CLK 2 signal. In addition, the MUX 124_2 selects and transfers the CLK 1 signal or the CLK 2 signal to the PWM SHIFT 122_2 according to the received SEL signal. Here, the MUX 124_2 selects and transfers the CLK 2 signal to the PWM SHIFT 122_2 according to the SEL signal. The PWM SHIFT 122_2 shifts and transfers the ST 2 signal to a second line, based on the ST 2 signal received from the PWM SHFT 122_1 and the CLK 2 signal received from the MUX 124_2.

Because the SEL signal is shifted by the SEL SHIFT in each pixel line unit and input to the MUX, the ST 1 signal and the CLK 1 signal are not affected by the ST 2 signal and the CLK 2 signal due to the SEL signal while being shifted in each pixel line unit. That is, while the ST 1 signal and the CLK 1 signal are sequentially transferred up to the N-th pixel line through the first pixel line via the shift register, even when the ST 2 signal and the CLK 2 signal are transferred back to the first pixel line through the shift register, the ST 1 signal and the CLK 1 signal that are being already transferred are not affected by the ST 2 signal and the CLK 2 signal and an error may not occur.

Therefore, by using multiple clock signals, different clock signals are applied respectively to the changed ST signals, and thus, the clock signal after being changed does not affect the shift register that is driving based on the clock signal before being changed, and an error does not occur.

In FIG. 9, the MUX 124_1 and the MUX 124_2 are included in the timing controller 120, but may not be included in the timing controller 120 and may be individually configured, and the embodiment is not limited thereto. Also, the MUXs 124_1 and 124_2 and the SEL SHIFTs 121_1 and 121_2 are shown as components for selecting the clock signal, but the component for selecting the clock signal may include other components of the display driving apparatus and is not limited thereto.

The operations of the clock signal selector (not shown), the MUXs 124_1 and 1242, the SEL SHIFTs 121_1 and 1212, and the PWM SHIFTs 122_1 and 122_2 described above may be implemented by a single device (e.g., the timing controller, the clock signal selector, the MUX, the SEL SHIFT, and the PWM SHIFT), or may be implemented by more devices.

Also, the timing controller 120 may include a pulse signal input terminal ST and a clock input terminal CLK.

Pulse signal input terminal ST receives inputs of pulse signals ST 1 and ST 2 regarding the time during which the LED emits light in relation to the PWM control. The pulse signal input terminal ST receives inputs of pulse signals ST 1 and ST 2 corresponding to the brightness of the display panel. In detail, the pulse signal input terminal ST may receives the inputs of pulse signals ST 1 and ST 2 having a width that is adjusted according to the brightness adjustment of the display panel.

A plurality of clock signals CLK 1 and CLK 2 input to the MUXs 124_1 and 124_2 in the timing controller 120 are input to clock input terminal CLK. There may be at least one clock input terminal CLK. The plurality of clock signals CLK 1 and CLK 2 input to clock terminals of the MUXs 124_1 and 124_2 may be input to the clock signal input terminals.

Figure 10:
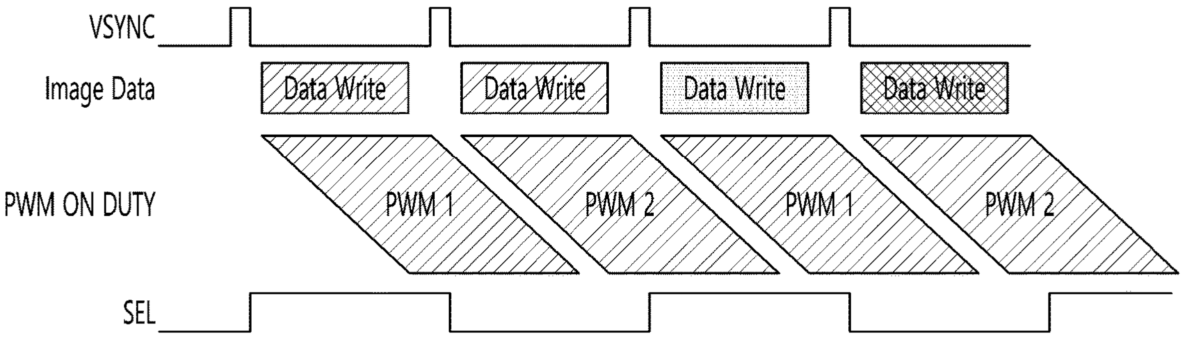
FIG. 10 is a timing diagram showing an example of a PWM clock signal output by a timing controller according to an embodiment.

FIG. 10 is a timing diagram showing an example of a PWM clock signal output by a timing controller according to an embodiment.

Referring to FIG. 10, a VSYNC signal for synchronizing between frames, an image data recording section, an LED emission section according to the PWM clock signals (PWM 1 and PWM 2) output by the timing controller, and timings of the SEL signal for selecting the CLK signal according to the PWM On-duty ratio in each VSYNC section may be identified.

For convenience of description, an example, in which, in a first frame section, a first PWM duty ratio (PWM On-duty) is set in response to the PWM 1, in a second frame section, a second PWM duty ratio is set in response to the PWM 2, in a third frame section, the first PWM duty ratio is set again in response to the PWM 1, and in a fourth frame section, the second PWM duty ratio is set again in response to the PWM 2, is shown.

Therefore, the PWM 1 is a PWM clock signal output by the timing controller based on the ST 1 signal and the CLK 1 signal. The PWM 2 is a PWM clock signal output by the timing controller based on the ST 2 signal and the CLK 2 signal. Each of the PWM 1 and the PWM 2 is expressed in a trapezoidal shape in order to indicate that the PWM 1 or PWM 2 is output after being sequentially shifted by 1 H from the first pixel line to the N-th pixel line.

In PWM 1, the SEL signal is in high-state and is shifted from the first pixel line to the N-th pixel line, and thus, the CLK 1 signal is selected. In PWM 2, the SEL signal is in low-state and synchronized with the VSYNC section to be shifted from the first pixel line to the N-th pixel line, and thus, the CLK 2 may be selected. Here, when the PWM clock signal is being output to the N-th pixel line through the first pixel line in the PWM 1, the CLK 1 signal of the N-th pixel line is not affected by the CLK 2 signal due to the SEL signal that is already in the high-state even when the CLK 2 signal is selected as the first pixel line in the PWM 2. Likewise, in the PWM 2, the SEL signal is in the low-state and shifted from the first pixel line to the N-th pixel line, and thus, the CLK 2 signal is selected. When the PWM clock signal is being output to the N-th pixel line through the first pixel line in the PWM 2, the CLK 2 signal of the N-th pixel line is not affected by the CLK 1 signal due to the SEL signal that is already in the low-state even when the CLK 1 is selected as the first pixel line in the next PWM 1.

Figure 11:
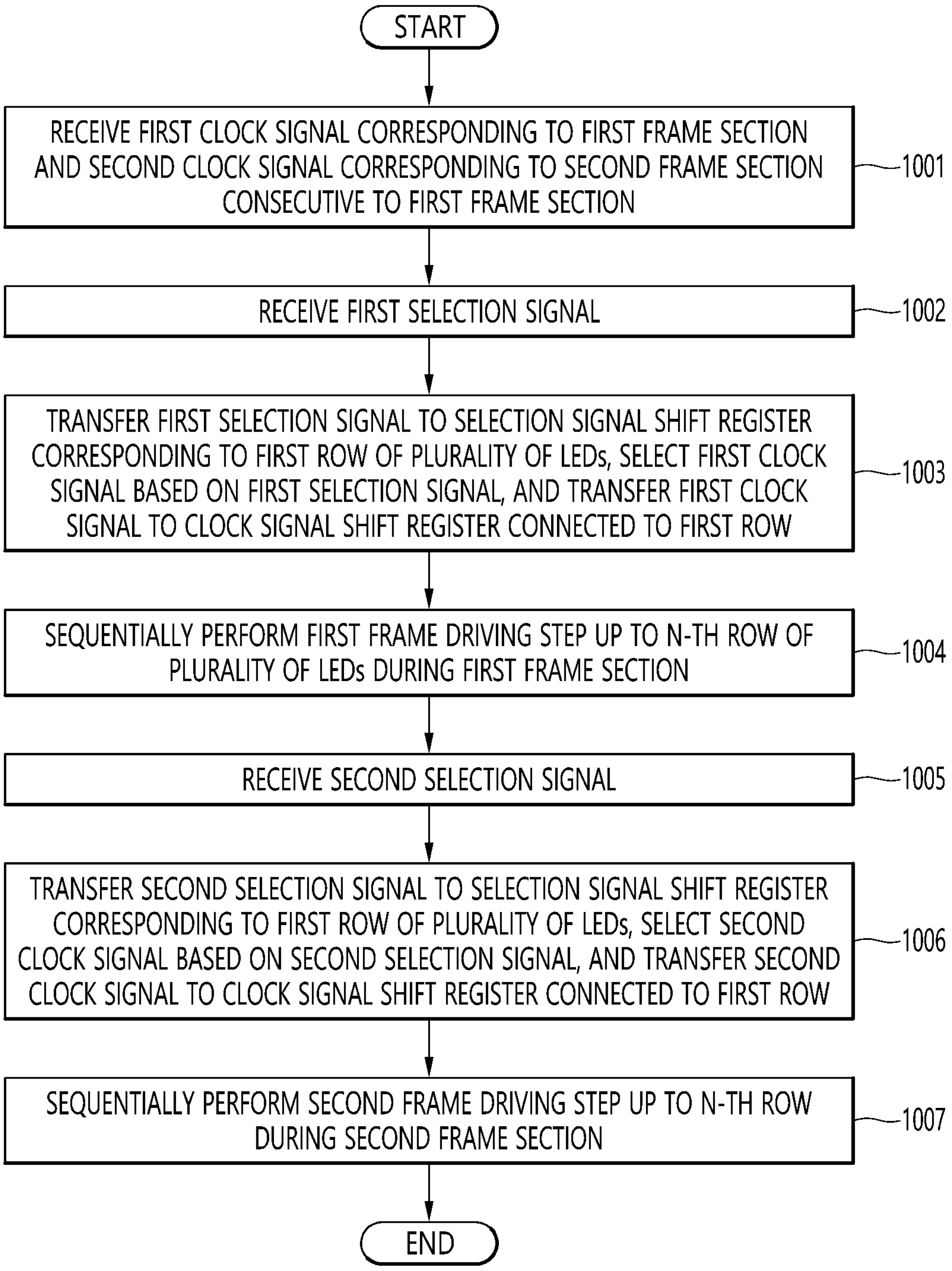
FIG. 11 is a flowchart for describing an example of a method of controlling a display driving apparatus according to an embodiment.

FIG. 11 is a flowchart for describing an example of a method of controlling a display driving apparatus according to an embodiment.

Referring to FIG. 11, the timing controller selectively supplies a plurality of clock signals to the pixel driving circuit. Regarding the supply of the clock signals from the timing controller to the pixel driving circuit, redundant descriptions that are already provided above with reference to FIGS. 2 to 10 are omitted.

In operation 1001, the timing controller receives a first clock signal corresponding to a first frame section and a second clock signal corresponding to a second frame section consecutive to the first frame section.

In operation 1002, the timing controller receives a first selection signal. The first selection signal is a selection signal for selecting the first clock signal.

In operation 1003, the timing controller transfers the first selection signal to a selection signal shift register corresponding to a first row of a plurality of LEDs, selects the first clock signal based on the first selection signal, and transfers the first clock signal to a clock signal shift register connected to the first row. Operation 1003 is referred to as a first frame driving step.

In operation 1004, the timing controller sequentially performs the first frame driving step during the first frame section up to an N-th row of the plurality of LEDs. The selection signal shift register transfers the first selection signal by sequentially shifting the first selection signal to the N-th row and transfers the first clock signal to the clock signal shift register based on the first selection signal that is sequentially transferred.

In operation 1005, a second selection signal is received. The second selection signal is a selection signal for selecting a second clock signal.

In operation 1006, the second selection signal is transferred to the selection signal shift register corresponding to the first row, the second clock signal is selected based on the second selection signal, and the second clock signal is transferred to the clock signal shift register connected to the first row. Operation 1006 is referred to as a second frame driving step.

In operation 1007, the second frame driving step is sequentially performed during the second frame section up to the N-th row. The selection signal shift register transfers the second selection signal by sequentially shifting the second selection signal to the N-th row and transfers the second clock signal to the clock signal shift register based on the second selection signal that is sequentially transferred. In a row where the first frame driving step and the second frame driving step overlap each other, the operation is only performed by the first clock signal. The first frame driving step is driven based on the first selection signal, and the second frame driving step is driven based on the second selection signal. Even when the first frame driving step and the second frame driving step are performed simultaneously in the overlapping time, the first frame driving step is driven based on the first selection signal, and thus is independently driven without being affected by the second clock signal based on the second selection signal. In other words, the at least one row in which the first frame driving step and the second frame driving step overlap each other may be operated by the first clock signal without being affected by the second clock signal based on the first selection signal, when receiving the second clock signal while being driven based on the first clock signal.

According to an embodiment of the disclosure, the pixel driving circuit is driven by the first clock signal without being affected by the second clock signal based on the first selection signal, when receiving the supply of the second clock signal while being driven based on the first clock signal.

Figure 12:
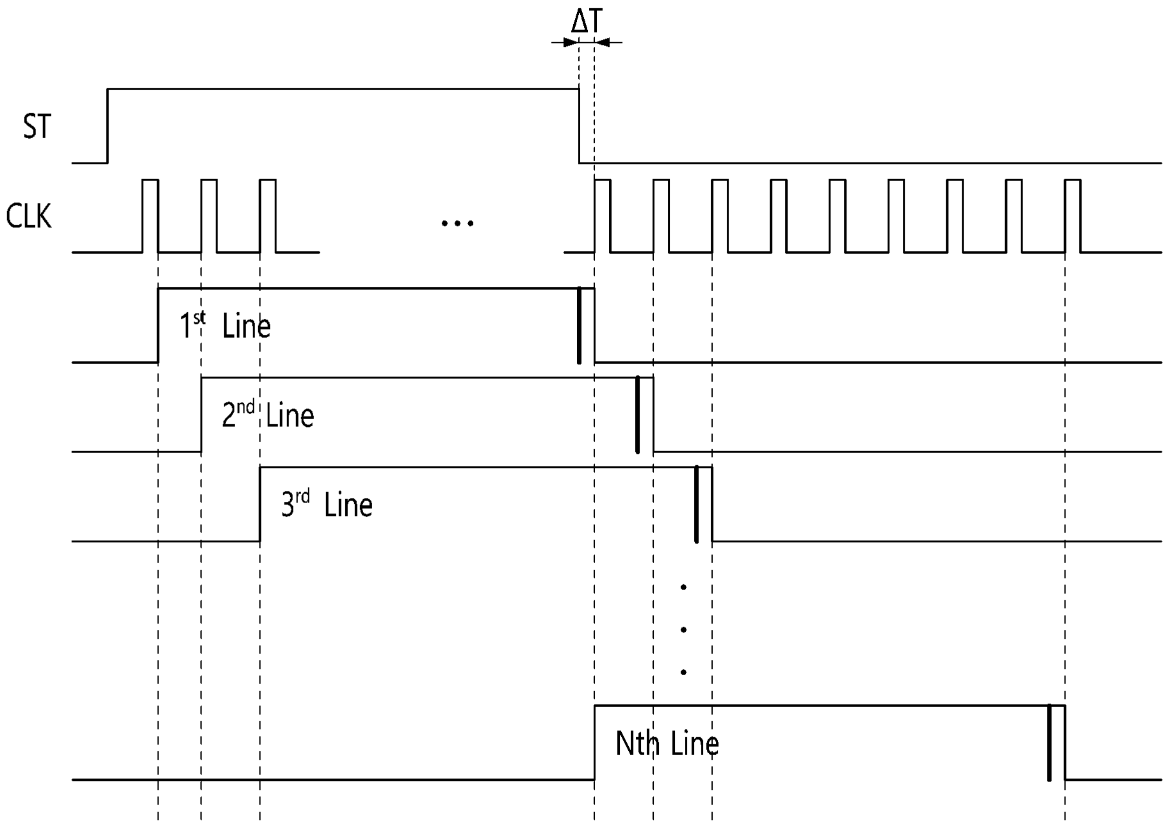
FIG. 12 is a timing diagram schematically showing a problem of a PWM clock signal output by a timing controller that does not use a dummy signal.

FIG. 12 is a timing diagram schematically showing a problem of a PWM clock signal output by a timing controller that does not use a dummy signal.

Referring to FIG. 12, an issue that occurs when an ST signal is input to the timing controller that does not use a dummy signal may be identified. In detail, when the width of the ST signal is changed, the change in driving, e.g., the brightness of the display, may be performed. In response to the change in the ST signal, the period of the CLK signal is also changed. The changed period of the CLK signal immediately applies to the entire circuits of the timing controller. Here, because the ST signal is shifted at regular time interval based on the period of the CLK, the ST signal may not be shifted with respect to a fine time internal as ΔT. That is, there is a limitation in adjusting the fine time interval as small as ΔT shown in FIG. 12. When the ST signal is shifted and output based on the period of the CLK signal by the timing controller that does not use the dummy signal, it is impossible to adjust the fine time interval as ΔT shown in FIG. 12 and there is a limitation in adjusting the brightness of the display.

Figure 13:
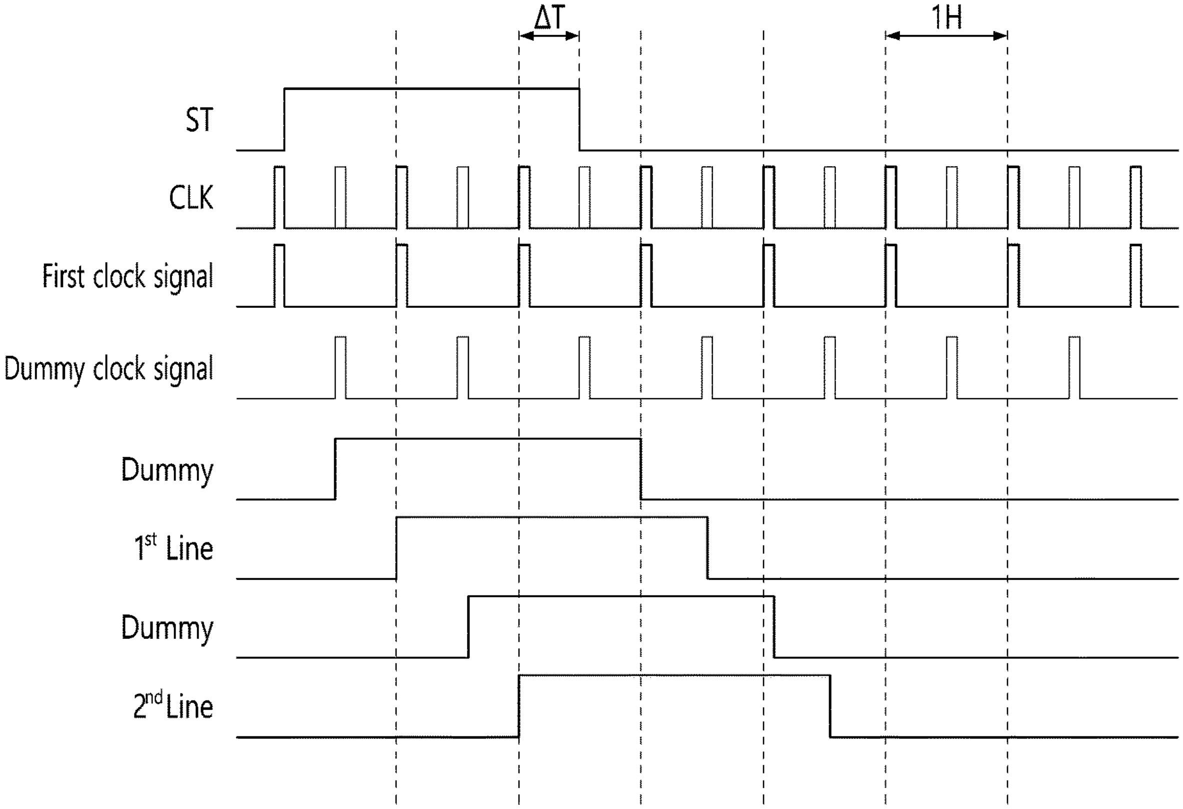
FIG. 13 is a timing diagram schematically showing a PWM clock signal output by a timing controller according to an embodiment.

FIG. 13 is a timing diagram schematically showing a PWM clock signal output by a timing controller according to an embodiment.

Referring to FIG. 13, the PWM clock signal is output with the fine time interval adjusted by ΔT.

Because the ST signal is shifted based on the CLK signal, the PWM clock signal is sequentially output to the plurality of pixel lines. The CLK signal includes a first clock signal and a dummy clock signal. The first clock signal has a period (1H) for controlling the sequential output to the plurality of pixel lines. The dummy clock signal is generated based on the first clock signal. For example, the CLK signal includes the first clock signal having a period of 1 H and a dummy signal that is obtained by delaying the first clock signal by a time interval of 1H-ΔT. When the ST signal is shifted by a first dummy clock signal included in the CLK signal, the dummy signal is generated. The generated dummy signal is not output to the pixel line. In addition, the ST signal, which is once shifted by the first dummy clock signal, is shifted by a second first clock signal included in the CLK signal, and then, the PWM clock signal is generated. That is, the ST signal is once shifted by the first clock signal and then is shifted once again by the dummy clock signal, and thus, the PWM clock signal output to the first pixel line is generated through two shifts. Here, the PWM clock signal generated by being shifted by the second first clock signal is adjusted by the ON-time by a fourth dummy clock signal.

When the dummy clock signal is generated based on the first clock signal, the dummy clock signal may be generated by delaying the first clock signal in response to a desired ON-time of the PWM clock signal. The dummy clock signal may be generated in response to the desired ON-time without any time internal limitation within the period (1H) of the first clock signal. The PWM signal that is adjusted by the desired ON-time is output to the first pixel line. According to the disclosure, there is an effect of adjusting the fine time interval as ΔT with respect to the PWM clock signal by using the dummy signal. Likewise, through the same process as above, a second dummy signal is generated based on a second dummy clock signal. In addition, the PWM clock signal is generated by a third first clock signal, and the generated PWM clock signal is output to a second pixel line. The ON-time of the PWM clock signal output to the second pixel line is adjusted by a fifth dummy clock signal.

In an example, the ST signal is input to the shift register, and the input ST signal is shifted based on the dummy block signal from a first sub-flipflop in the shift register to generate a dummy signal. The generated dummy signal is not output to the pixel line. In addition, a main flipflop receives the ST signal that is shifted once, and then, shifts the ST signal based on the first clock signal to generate the PWM clock signal. Detailed descriptions are provided with reference to FIG. 14.

The dummy clock signal is generated based on the first clock signal. In an example, the dummy clock signal may be generated by delaying the first clock signal by a certain time interval. In another example, in order to reduce the ON-time of the PWM clock signal by ΔT, the first clock signal is delayed by 1H-ΔT to generate the dummy clock signal.

The timing controller outputs one PWM clock signal using two shifts. In detail, the timing controller does not output the dummy signal that is generated through one shift, but outputs the PWM clock signal generated through two shifts to the pixel line.

In addition, the PWM clock signal generated by the first clock signal included in the CLK signal is output to the pixel line, but the dummy signal generated by the dummy clock signal included in the CLK signal is not output to the pixel line.

According to an embodiment of the disclosure, the dummy signal and the PWM clock signal are generated based on one clock signal (CLK signal), and thus, the brightness of the LED may be adjusted finely by adjusting the ON-time of the PWM clock signal.

Figure 14:
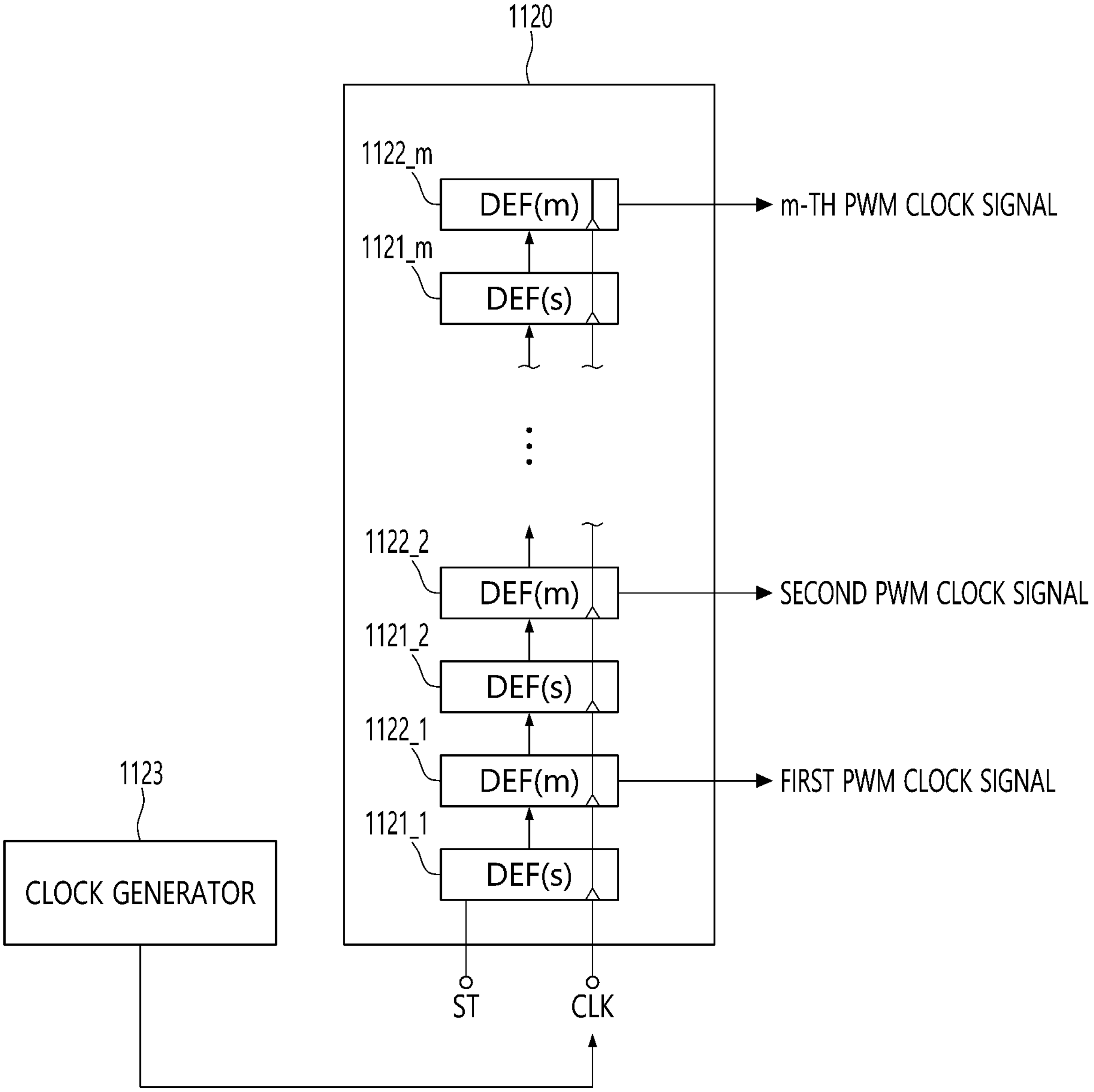
FIG. 14 is a circuit diagram schematically showing a configuration of a timing controller according to an embodiment.

FIG. 14 is a circuit diagram schematically showing a configuration of a timing controller according to an embodiment.

Referring to FIG. 14, a timing controller 1120 includes m first flipflops 1121_1, 11212, . . . , **1121_*m* and m second flipflops 1122_1, 1122_2, . . . , 1122_*m* respectively connected to the m first flipflops 1121_1, 1121_2, . . . , 1121_*m***. The m first flipflops and the m second flipflops may be connected in series. Therefore, the signal output from the first flipflop is input to the second flipflop located next, and the signal output from the second flipflop may be input to the first flipflop located next. Through the serial connection of the m first flipflops and the m second flip-flops, a signal may be sequentially transmitted to the next flipflop.

The first flipflop receives the input of a signal first. However, unlike the example shown in the drawings of the specification, the first signal may be input to the first flipflop shown at the top. That is, the input direction of the signal may be selected according to a designer, and the display driving apparatuses 100 and 101 according to the specification are not limited by the examples shown in the specification. In an example, the first flipflop 1121_1 receives the input of a signal and shifts the ST signal once, and then, the dummy signal is generated. The dummy signal is not output to the pixel line. In addition, the ST signal that has been shifted once is input to the second flipflop 1122_1 and then is shifted once again, thereby generating the PWM clock signal. Here, the generated PWM clock signal is output to the pixel line as a first PWM clock signal.

Also, the timing controller 1120 may include a pulse signal input terminal ST and a clock input terminal CLK. The timing controller may include one shift register (not shown) or a plurality of shift registers (not shown). Each shift register (not shown) may include a pulse signal input terminal ST and a clock input terminal CLK.

In relation to the PWM control, the pulse signal corresponding to the time during which the LED emits light is input to the pulse signal input terminal ST. The pulse signal input terminal ST receives input of pulse signals corresponding to the brightness of the display panel. In detail, the pulse signal input terminal ST may receive the input of the pulse signal having a width that is adjusted according to the brightness adjustment of the display panel. The pulse signals input to the pulse signal input terminals ST in respective shift registers may have different lengths. In more detail, the lengths of the pulse signals respectively input to the pulse signal input terminals ST in the shift registers adjacent to each other may be two times different from each other. A shift register corresponding to a most significant bit MSB in grayscale data input to the pixel is referred to as a first shift register, and a shift register corresponding to a next significant bit is referred to as a second shift register. Here, the length of the pulse signal input to the pulse signal input terminal ST of the first shift register is two times greater than that of the pulse signal input to the pulse signal input terminal ST of the second shift register. For example, when a size of the gradation data input to the pixel is 10 bits, the length of the pulse signal input to the pulse signal input terminal ST of the first shift register may be 512 times greater than that of the pulse signal input to the pulse signal input terminal ST of a tenth shift register corresponding to a least significant bit LSB.

The clock signals input to the m first flipflops 1121_1, 1121_2, . . . , 1121_*m* and the m second flipflops 1122_1, 1122_2, . . . , 1122_*m* are input to the clock input terminal CLK. In an example, a clock signal including a first clock signal and a dummy clock signal may be input.

In addition, the timing controller 1120 may generate a first clock signal according to the PWM duty ratio. In addition, the timing controller 1120 may generate the dummy clock signal based on the first clock signal. In an example, the timing controller 1120 may include a clock generator 1123. The clock generator 1123 may generate a first clock signal according to the PWM duty ratio. In addition, the clock generator 1123 may generate the dummy clock signal based on the first clock signal.

Figure 15:
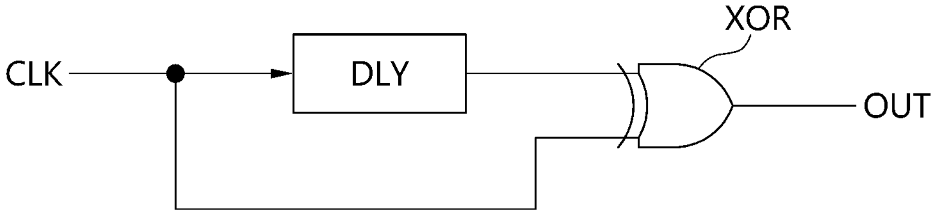
FIG. 15 is a circuit diagram schematically showing a configuration of a timing controller generating a dummy clock signal, according to an embodiment.

FIG. 15 is a circuit diagram schematically showing a configuration of a timing controller generating a dummy clock signal, according to an embodiment.

The timing controller may include the circuit shown in FIG. 15. In an example, the timing controller may include a clock generator including the circuit shown in FIG. 15, but is not limited thereto.

Referring to FIG. 15, the timing controller receives the CLK signal. The timing controller may include a DLY that generates a dummy clock signal by delaying the received CLK signal by a certain time interval. In addition, the timing controller may include an XOR gate or an OR gate selectively outputting a dummy clock signal and the CLK signal. In an example, the timing controller receives the first clock signal according to the PWM duty ratio. In addition, the timing controller generates the dummy clock signal by delaying the first clock signal by a certain period through the DLY. The timing controller sequentially outputs the first clock signal and the dummy clock signal through an OUT via the XOR gate or the OR gate. Therefore, the output clock signal includes the first clock signal and the dummy clock signal.

However, the structure for generating a dummy clock signal of the timing controller as shown in FIG. 15 is an example, and is shown only for understanding of the disclosure. Therefore, the structure of generating the dummy clock signal according to the disclosure is not limited by the example of FIG. 15.

Figure 16:
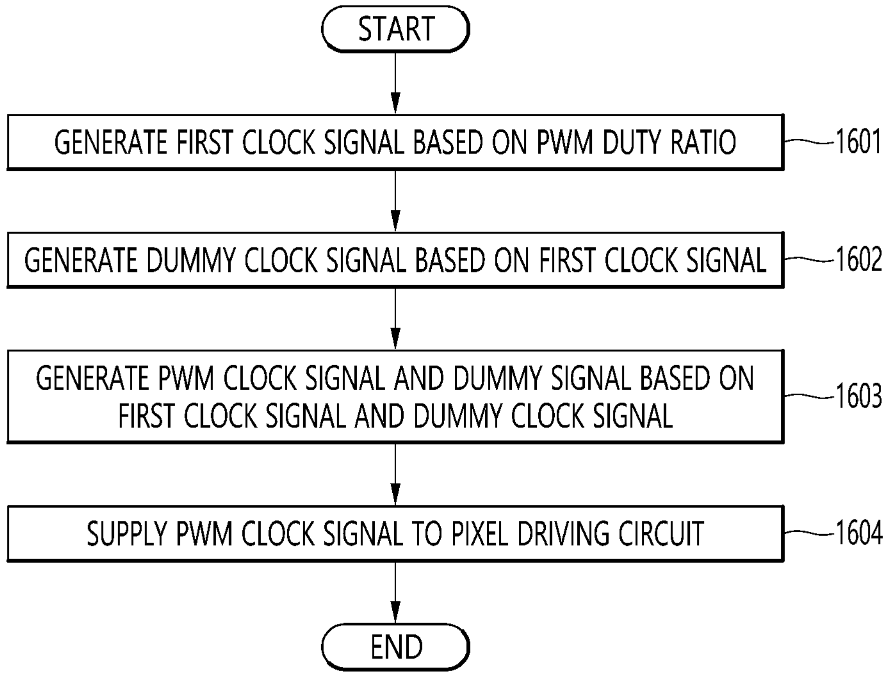
FIG. 16 is a flowchart for describing an example of a method of controlling a brightness of a pixel by using a dummy signal, according to an embodiment.

FIG. 16 is a flowchart for describing an example of a method of controlling a brightness of a pixel by using a dummy signal, according to an embodiment.

Referring to FIG. 16, the timing controller controls the brightness of the pixel by outputting the PWM clock signal to the pixel line using a dummy signal. In the descriptions about the timing controller generating the first clock signal and the dummy clock signal, generating the PWM clock signal and the dummy signal based on the first clock signal and the dummy clock signal, and supplying the PWM clock signal to the pixel driving circuit, redundant descriptions provided above with reference to FIGS. 2 to 15 are omitted.

In operation 1601, the timing controller generates a first clock signal based on the PWM duty ratio.

In operation 1602, the timing controller generates a dummy clock signal based on the first clock signal. In an example, the timing controller generates the dummy clock signal by delaying the first clock signal by a certain time interval.

In operation 1603, the timing controller generates the PWM clock signal and the dummy signal based on the first clock signal and the dummy clock signal.

In operation 1604, the timing controller supplies the PWM clock signal to the pixel driving circuit. In an example, the timing controller supplies the PWM clock signal to the pixel driving circuit, and does not supply the dummy signal to the pixel driving circuit.

It will be understood by one of ordinary skill in the art that various changes in form and details may be made therein without departing from the spirit and scope of the present disclosure as defined by the appended claims. Therefore, the disclosed methods should be considered from an explanatory rather than a limiting perspective, and the scope of rights is indicated in the claims, not the foregoing description, and should be interpreted to include all differences within the equivalent scope.

The invention claimed is:

1. A display driving apparatus comprising:

a pixel driving circuit connected to each of a plurality of light-emitting diodes (LEDs) forming at least one row and column and configured to drive the LEDs in a pulse width modulation (PWM) method;

a controller configured to determine a PWM duty ratio (PWM On-duty) indicating a light emitting time period of the LED during one frame section; and a timing controller configured to generate a first clock signal according to the PWM duty ratio and supply the first clock signal to the pixel driving circuit in a row or column unit through a shift register, wherein, when the PWM duty ratio is changed, the timing controller is configured to generate a second clock signal matching the changed PWM duty ratio, and selectively supply the first clock signal or the second clock signal to the pixel driving circuit.

2. The display driving apparatus of claim 1, wherein the timing controller comprises:

at least one flipflop including an output terminal connected to the pixel driving circuit; and at least one multiplexer (MUX) for selecting a clock signal input to a clock terminal of the at least one flipflop.

3. The display driving apparatus of claim 2, wherein the timing controller comprises:

a pulse signal input terminal to which a pulse signal corresponding to the brightness of the LED is input; and at least one clock input terminal to which a plurality of clock signals are input.

4. The display driving apparatus of claim 3, wherein the MUX is configured to receive the plurality of clock signals from the at least one clock input terminal, and select one clock signal input to the clock terminal of the at least one flipflop, from among the plurality of clock signals.

5. The display driving apparatus of claim 4, wherein the MUX is configured to select one clock signal input to the clock terminal of the at least one flipflop by using a switch.

6. The display driving apparatus of claim 1, wherein the timing controller is configured to generate a first clock signal according to the PWM duty ratio, generate a PWM clock signal based on the first clock signal through the shift register, and supply the PWM clock signal to the pixel driving circuit in a row or column unit, and when the PWM duty ratio is changed, generate a second clock signal matching the changed PWM duty ratio, select the first clock signal or the second clock signal, generate a PWM clock signal based on the selected clock signal, and supply the PWM clock signal to the pixel driving circuit.

7. The display driving apparatus of claim 1, wherein the timing controller is configured to generate a first selection signal for selecting the first clock signal and a second selection signal for selecting the second clock signal, and selectively supply the first clock signal and the second clock signal to the pixel driving circuit based on the first selection signal and the second selection signal, and the first clock signal and the second clock signal are operated independently from each other with respect to the pixel driving circuit.

8. The display driving apparatus of claim 1, wherein the timing controller comprises:

a clock signal selector configured to output a selection signal for selecting a first clock signal or a second clock signal based on driving information of the pixel driving circuit; and a MUX configured to output the first clock signal or the second clock signal based on the selection signal output from the clock signal selection unit.

9. A display driving apparatus comprising:

a pixel driving circuit connected to each of a plurality of light-emitting diodes (LEDs) forming at least one row and column and configured to drive the LEDs in a pulse width modulation (PWM) method;

a scan driving circuit configured to sequentially output a first signal to LEDs arranged in a first direction, from among the LEDs connected to the pixel driving circuit;

a data driving circuit configured to output a second signal to LEDs arranged in a second direction, from among the LEDs connected to the pixel driving circuit; and the timing controller according to claim 1.

10. A method of controlling a display driving apparatus, the method comprising:

receiving a first clock signal corresponding to a first frame section and a second clock signal corresponding to a second frame section that is consecutive to the first frame section;

receiving a first selection signal;

a first frame driving step, in which the first selection signal is transferred to a selection signal shift register that corresponds to a first row of a plurality of light-emitting diodes (LEDs), a first clock signal is selected based on the first selection signal, and the first clock signal is transferred to a clock signal shift register connected to the first row;

sequentially performing the first frame driving step up to an N-th row of the plurality of LEDs during the first frame section;

receiving a second selection signal;

a second frame driving step, in which the second selection signal is transferred to a selection signal shift register corresponding to the first row, the second clock signal is selected based on the second selection signal, and the second clock signal is transferred to the clock signal shift register connected to the first row; and sequentially performing the second frame driving step up to the N-th row during a second frame section, wherein at least one row in which the first frame driving step and the second frame driving step overlap each other is driven only by the first clock signal.

* * * * *